United States Patent [19]

Cracraft et al.

[11] 3,836,853
[45] Sept. 17, 1974

[54] APPARATUS FOR MEASURING THE SPEED OF A MOVING MEMBER

[75] Inventors: Larry F. Cracraft; Richard C. Oppmann; Edward G. Whitaker, all of Kokomo, Ind.

[73] Assignee: General Motors Corporation, Detroit, Mich.

[22] Filed: Oct. 10, 1973

[21] Appl. No.: 404,987

[52] U.S. Cl................. 324/166, 307/235, 307/261, 307/271, 328/20, 328/28, 328/140, 307/300
[51] Int. Cl. .............................................. G01p 3/48
[58] Field of Search............ 324/161, 166, 173–175, 324/78 I, 78 E; 307/225, 235, 261, 271, 300; 328/20, 28, 29, 31, 32, 140

[56] References Cited
UNITED STATES PATENTS

| | | | |
|---|---|---|---|
| 3,543,110 | 11/1970 | Ruof | 324/166 |
| 3,566,159 | 2/1971 | Plunkett | 328/32 X |
| 3,601,705 | 8/1971 | Germann | 328/20 X |
| 3,622,801 | 11/1971 | Stone | 324/175 UX |
| 3,764,927 | 10/1973 | Allinger | 307/225 X |
| 3,798,529 | 3/1974 | Jones | 328/140 X |

*Primary Examiner*—Michael J. Lynch
*Attorney, Agent, or Firm*—T. G. Jagodzinski

[57] ABSTRACT

A pair of complementary bilevel signals are cyclically produced at a frequency proportional to the speed of a moving member. The bilevel signals are derived through at least a pair of junction transistors for delaying either the rise or the fall of the bilevel signals due to the minority carrier storage effect in at least the pair of transistors. Successive trigger pulses are each developed in response to the resulting overlap between the complementary bilevel signals during level transitions. Successive incremental pulses of constant width and constant amplitude are produced in response to the trigger pulses. The incremental pulses are integrated to provide an analog signal which is substantially constant at a level proportional to the speed of the moving member.

2 Claims, 2 Drawing Figures

APPARATUS FOR MEASURING THE SPEED OF A MOVING MEMBER

This invention relates to an apparatus for measuring the speed of a moving member.

According to one aspect of the invention, a speed sensor is responsive to the motion of the moving member for producing a sensor signal which periodically rises above and falls below a reference level at a frequency proportional to the speed of the moving member. Preferably, the sensor signal is a symmetrical square wave or sine wave.

In another aspect of the invention, a bilevel signal generator is responsive to the sensor signal and to the reference level for producing a first bilevel signal which rises to an upper level as the sensor signal rises above the reference level and which falls to a lower level as the sensor signal falls below the reference level and for producing a second bilevel signal which rises to an upper level as the sensor signal falls below the reference level and which falls to a lower level as the sensor signal rises above the reference level. Hence, the first and second bilevel signals are complementary.

As contemplated by a further aspect of the invention, the bilevel signal generator includes at least a pair of junction transistors through which the first and second bilevel signals are respectively derived for appreciably delaying either the rise or the fall of the bilevel signals due to the minority carrier storage effect in at least the pair of transistors. Thus, the first and second logic signals overlap to some extent during level transitions.

According to yet another aspect of the invention, a trigger pulse generator is responsive to the first and second bilevel signals and is responsive to a threshold level defined between the upper and lower levels of the bilevel signals for producing successive trigger pulses each developed when the first and second bilevel signals are either both above or both below the threshold level such that the trigger pulses are developed in response to an overlap between the first and second bilevel signals. Hence, the frequency of the trigger pulses is twice the frequency of the sensor signal.

In a still further aspect of the invention, an incremental pulse generator is responsive to the trigger pulses for producing successive incremental pulses each having a constant amplitude and a constant width and each initiated in response to a different one of the trigger pulses. Subsequently, the incremental pulses are integrated to provide an analog signal which is substantially constant at a level proportional to the speed of the moving member.

These and other aspects and advantages of the invention may be best understood by reference to the following detailed description of a preferred embodiment when considered in conjunction with the accompanying drawing.

Figure 1:
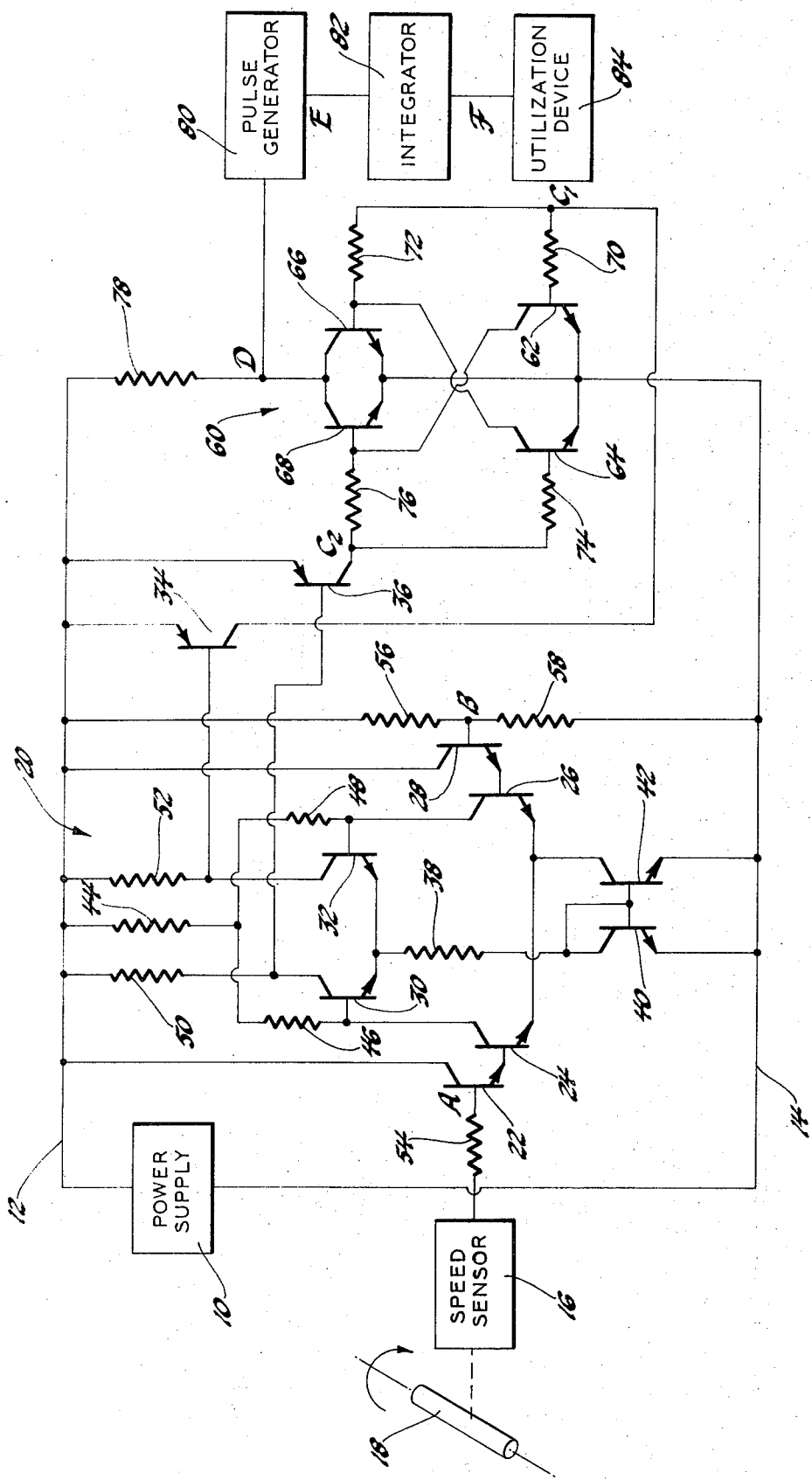
FIG. 1 is a schematic diagram of an apparatus incorporating the principles of the invention.

Referring to FIG. 1, a power supply 10 is connected between a high potential or bias line 12 and a low potential or ground line 14. The power supply 10 may be provided by any suitable source of electrical energy such as a conventional electrochemical storage battery.

Figure 2:
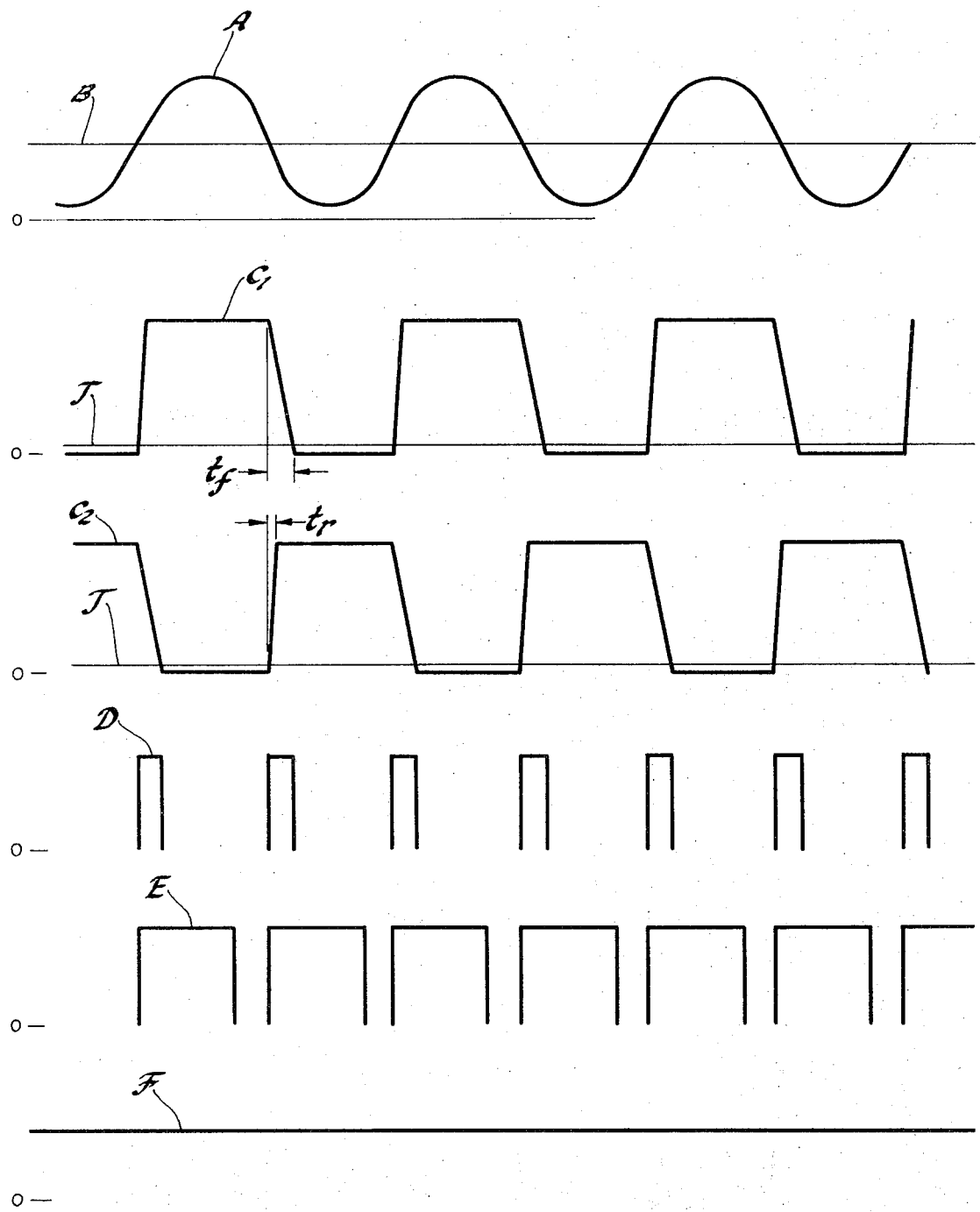
FIG. 2 is a graphic diagram of several waveforms useful in explaining the operation of the apparatus illustrated in FIG. 1.

A speed sensor 16, which may or may not be connected to the power supply lines 12 and 14, is responsive to the motion of a moving member 18 to produce a sensor signal A as shown in FIG. 2. The sensor signal A periodically rises above and falls below a reference level B at a frequency proportional to the speed of the moving member 18.

Although the moving member 18 is depicted as a rotating shaft, it is to be understood that the member 18 may be virtually any element exhibiting virtually any movement the speed of which is to be measured. Similarly, the speed sensor 16 may be any suitable transducer capable of converting the mechanical movement of the member 18 to a periodic electrical wave like sensor signal A whether the energy conversion is accomplished by an electromagnetic, photoelectric or other transducer principle. Preferably, the sensor signal A is a symmetrical sine wave or square wave.

A bilevel signal generator 20, connected between power supply lines 12 and 14, includes a two-stage differential amplifier having a first stage provided by NPN junction transistors 22, 24, 26 and 28 and a second stage provided by NPN junction transistors 30 and 32. The transistors 22 and 28 are emitter-followers while the transistors 24, 26, 30 and 32 are switching transistors. In addition, the bilevel signal generator 20 includes a buffer stage provided by PNP junction transistors 34 and 36.

The combination of bias resistor 38, the base-emitter junction diode of NPN junction transistor 40, and NPN junction transistor 42 provide a temperature compensated current sink for the first and second stages of the differential amplifier. The bias network formed by the resistors 44, 46 and 48 provides collector bias for the first stage switching transistors 24 and 26 and provides base bias for the second stage switching transistors 30 and 32. Similarly, the resistors 50 and 52 provide collector bias for the second stage switching transistors 30 and 32 and provide base bias for the buffer transistors 36 and 34, respectively.

The sensor signal A is applied as one input to the differential amplifier through resistor 54. The other input to the differential amplifier is a bias voltage defined at the reference level B by the voltage divider action of resistors 56 and 58. In addition, it may be necessary to apply the bias voltage to the speed sensor 16 in order to properly develop the sensor signal A with respect to the reference level B.

As the sensor signal A rises above the reference level B, the bilevel signal generator 20 shifts to a first state in which the transistors 22, 24, 32 and 34 are rendered conductive and the transistors 26, 28, 30 and 36 are rendered nonconductive. Conversely, as the sensor signal A falls below the reference level B, the logic signal generator 20 shifts to a second state in which the transistors 26, 28, 30 and 36 are rendered conductive and the transistors 22, 24, 32 and 34 are rendered nonconductive.

First and second complementary bilevel signals $C_1$ and $C_2$, as shown in FIG. 2, are defined between the collector electrodes of transistors 34 and 36 and the ground line 14, respectively. As the bilevel signal generator 20 shifts to the first state, the first bilevel signal $C_1$ rises to an upper level while the second bilevel signal $C_2$ falls to a lower level. Alternately, as the bilevel signal generator 20 shifts to the second state, the first bilevel signal $C_1$ falls to a lower level while the second bilevel signal $C_2$ rises to an upper level. It will be noted that the fall of the bilevel signals $C_1$ and $C_2$ is appreciably delayed over a relatively long fall time $t_f$. This phenomena, which is greatly exaggerated in FIG. 2 for purposes of illustration, primarily results from the minority carrier storage effect in the transistors 34 and 36.

More specifically, while the transistors 34 and 36 are turned on, minority carriers are stored in the base regions of the transistors 34 and 36 in the well-known manner. As the transistors 34 and 36 are turned off, the stored minority carriers are gradually depleted from the base region so as to define the relatively long fall time $t_f$. Although no comparable effect occurs as the transistors 34 and 36 are turned on, the first and second bilevel signals $C_1$ and $C_2$ do exhibit a relatively short rise time $t_r$. Of course, if the transistors 34 and 36 were of the NPN-type rather than PNP-type, it is the rise time $t_r$ rather than the fall time $t_f$ which would be extended by the minority carrier storage effect.

It is to be recognized that the minority carrier storage effect in the switching transistors 30 and 32 also contributes to some extent to the length of the fall time $t_f$ of the first and second bilevel signals $C_1$ and $C_2$. Further, it will be appreciated that although the bilevel signals $C_1$ and $C_2$ are shown to linearly rise and fall between the upper and lower levels, this depiction is merely a convenient approximation. In actuality, the transitions in the first and second bilevel signals $C_1$ and $C_2$ are most certainly not linear.

A trigger pulse generator or bilevel signal processor 60 includes a pair of cross-coupled switching stages connected between the power supply lines 12 and 14. The first switching stage includes NPN junction transistors 62 and 64 while the second switching stage includes NPN junction transistors 66 and 68. The first bilevel signal $C_1$ is applied through input resistors 70 and 72 to the switching transistors 62 and 66, respectively. The second bilevel signal $C_2$ is applied through input resistors 74 and 76 to the switching transistors 64 and 68, respectively. Successive trigger pulses D, as shown in FIG. 2, are developed across output resistor 78 in response to an overlap between the first and second bilevel signals $C_1$ and $C_2$ as one of the signals $C_1$ and $C_2$ rises toward the upper level as the other of the signals $C_1$ and $C_2$ falls toward the lower level. Hence, the frequency of the trigger pulses D is twice the frequency of the sensor signal A.

Specifically, the trigger pulse generator 60 is responsive to a threshold level T which is defined slightly above the lower level of the first and second bilevel signals $C_1$ and $C_2$ by an amount approximately equal to the base-emitter junction voltage drop of the switching transistors 62, 64, 66 and 68. When the first bilevel signal $C_1$ is above the threshold level T, the transistors 62 and 66 are rendered conductive. With the transistor 62 turned on, the transistor 68 is rendered nonconductive. When the second bilevel signal $C_2$ is above the threshold level T, the transistors 64 and 68 are rendered conductive. With the transistor 64 turned on, the transistor 66 is rendered nonconductive. A trigger pulse D is developed across the resistor 78 only when both the switching transistors 66 and 68 are turned off. This condition occurs only when both the first and second bilevel signals $C_1$ and $C_2$ are above the threshold level T due to an overlap during respective transitions between the upper and lower levels.

An incremental pulse generator 80 is connected to the output of the trigger pulse generator 60 for producing successive incremental pulses E each having a constant amplitude and a constant width. Further, the incremental pulses E are each developed in response to a different one of the trigger pulses D such that the frequency of the successive incremental pulses E is equal to the frequency of the successive trigger pulses D. The incremental pulse generator 80 may be provided by a monostable multivibrator having an RC timing network for determining the width of the incremental pulses E.

An integrator 82 is connected to the incremental pulse generator 80 for integrating or summing the incremental pulses E to provide an analog signal F as shown in FIG. 2. The analog signal F is substantially constant at a level proportional to the frequency of the incremental pulses E. Since the frequency of the incremental pulses E is in turn proportional to the speed of the moving member 18, the level of the analog signal F is likewise proportional to the speed of the moving member 18. The integrator 82 may be provided by an RC filter.

A utilization device 84 is connected to the integrator 82 for acting in response to the level of the analog signal F. The utilization device 84 may be an indicator for providing a perceptible or telltale indication of the speed of the moving member 18 or it may be a controller for regulating the operation of yet another contrivance in response to the speed of the moving member 18.

It will now be appreciated that the illustrated embodiment of the invention is presented for demonstrative purposes only and that various modifications and alterations may be made to the illustrated embodiment without departing from the spirit and scope of the invention.

What is claimed is:

1. Apparatus for measuring the speed of a moving member, comprising: means for producing a sensor signal which periodically rises above and falls below a reference level at a frequency proportional to the speed of the moving member; means for producing a first bilevel signal which rises to an upper level as the sensor signal rises above the reference level and which falls to a lower level as the sensor signal falls below the reference level and for producing a second bilevel signal which rises to an upper level as the sensor signal falls below the reference level and which falls to a lower level as the sensor signal rises above the reference level, the means including at least a pair of junction transistors through which the first and second bilevel signals are respectively derived for appreciably delaying either the rise or the fall of the first and second bilevel signals due to the minority carrier storage effect in at least the pair of transistors such that the first and second bilevel signals overlap during respective transitions between the upper and lower levels; means for producing successive trigger pulses each developed in response to the overlap of the first and second bilevel signals during successive transitions between the upper and lower levels such that the frequency of the trigger pulses is twice the frequency of the sensor signal; means for producing successive incremental pulses each having a constant amplitude and a constant width and each developed in response to a different one of the trigger pulses; and means for integrating the successive incremental pulses to produce an analog signal which is substantially constant at a level proportional to the speed of the moving member.

2. Apparatus for measuring the speed of a moving member, comprising: means responsive to the motion of the moving member for producing a sensor signal which periodically rises above and falls below a reference level at a frequency porportional to the speed of the moving member; means responsive to the sensor signal and to the reference level for producing a first bilevel signal which rises to an upper level when the sensor signal rises above the reference level and which falls to a lower level when the sensor signal falls below the reference level and for producing a second bilevel signal which rises to an upper level when the sensor signal falls below the reference level and which falls to a lower level when the sensor signal rises above the reference level, the means including at least a pair of junction transistors through which the first and second bilevel signals are respectively derived for appreciably delaying either the rise or the fall of the first and second bilevel signals due to the minority carrier storage effect in at least the pair of transistors such that during respective transitions between the upper and lower levels the first and second bilevel signals are either both above or both below a threshold level defined between the upper and lower levels; means responsive to the first and second bilevel signals and responsive to the threshold level for producing successive trigger pulses each developed when the first and second bilevel signals are either both above or both below the threshold level such that the frequency of the trigger pulses is twice the frequency of the sensor signal; means responsive to the trigger pulses for producing successive incremental pulses each having a constant amplitude and a constant width and each developed in response to a different one of the incremental pulses for producing an analog signal by integrating the incremental pulses such that the analog signal is substantially constant at a level proportional to the speed of the moving member.

* * * * *